United States Patent
Howard

(10) Patent No.: US 7,201,019 B2
(45) Date of Patent: Apr. 10, 2007

(54) LIGHT GAS COMPONENT SEPARATION FROM A CARBON DIOXIDE MIXTURE

(75) Inventor: Henry Edward Howard, Grand Island, NY (US)

(73) Assignee: Praxair Technology, Inc., Danbury, CT (US)

(*) Notice: Subject to any disclaimer, the term of this patent is extended or adjusted under 35 U.S.C. 154(b) by 105 days.

(21) Appl. No.: 10/991,458

(22) Filed: Nov. 19, 2004

(65) Prior Publication Data
US 2006/0107691 A1    May 25, 2006

(51) Int. Cl.
*F25J 3/00* (2006.01)

(52) U.S. Cl. ............ 62/617; 62/639; 62/928; 62/931

(58) Field of Classification Search ........... 62/617, 62/639, 931, 928
See application file for complete search history.

(56) References Cited

U.S. PATENT DOCUMENTS

| | | | |
|---|---|---|---|
| 3,355,902 A | 12/1967 | Crawford et al. | 62/28 |
| 3,740,962 A | 6/1973 | Fan | 62/29 |
| 3,850,593 A * | 11/1974 | Beaujean et al. | 62/625 |
| 4,097,250 A | 6/1978 | Pagani et al. | 55/48 |
| 4,441,911 A | 4/1984 | Clark et al. | 71/91 |
| 4,492,593 A * | 1/1985 | Diaz | 62/626 |
| 4,511,382 A | 4/1985 | Valencia et al. | 62/20 |
| 5,011,521 A | 4/1991 | Gottier | 62/11 |
| 5,329,775 A | 7/1994 | Fiedler et al. | 62/24 |
| 5,927,103 A * | 7/1999 | Howard | 62/620 |
| 5,983,663 A * | 11/1999 | Sterner | 62/620 |
| 6,035,662 A * | 3/2000 | Howard et al. | 62/617 |

OTHER PUBLICATIONS

Isalski, "Separation of Gases", Clarendon Press (1989).

* cited by examiner

*Primary Examiner*—William C. Doerrler
(74) *Attorney, Agent, or Firm*—David M. Rosenblum

(57) ABSTRACT

A method of separating one or more light components, such as helium, from a carbon dioxide containing stream. A two-phase stream is obtained, at least in part, by cooling a pressurized feed stream to at least partially condense such stream. The stream that is subsequently degassed to produce a first vapor stream enriched in the light component(s) and a first liquid stream containing an entrained fraction of the light component(s). The first liquid stream is expanded to create another two-phase stream that is degasified to produce a second vapor stream that is also enriched in the light component(s) and a second liquid stream having an enriched carbon dioxide content. The second liquid stream is repressurized and vaporized. In case of a supercritical feed, the pressurized feed stream is expanded after having been cooled. Thereafter, the feed is degassed to produce the light component enriched vapor stream and a liquid stream enriched in the carbon dioxide. The resultant vapor streams, enriched in the light component(s) may then be further processed to isolate the light components.

19 Claims, 2 Drawing Sheets

LIGHT GAS COMPONENT SEPARATION FROM A CARBON DIOXIDE MIXTURE

FIELD OF THE INVENTION

The present invention relates to a method of separating one or more light gas components in a carbon dioxide containing gaseous mixture containing a high concentration of carbon dioxide. More particularly, the present invention relates to such a method in which the carbon dioxide containing mixture is degassed to produce vapor and liquid streams and the liquid stream is expanded and further degassed to produce additional vapor and liquid.

BACKGROUND OF THE INVENTION

Helium occurs naturally in very low concentrations within underground natural gas and carbon dioxide reservoirs. In some instances, helium is present at sufficiently high concentrations to justify its recovery. In general, helium can be effectively recovered from gas streams containing at least 0.1 mole percent helium or greater. Helium is typically first concentrated into a crude helium stream that contains about 70 mole percent helium. The crude helium can be stored, typically in underground reservoirs, or subsequently further purified and liquefied for merchant sale.

There is a growing demand for large quantities of carbon dioxide and applications such as enhanced oil recovery. This demand has increased the interest of extracting valuable helium from such carbon dioxide rich streams. It is to be noted that vast quantities of carbon dioxide are processed in enhanced oil recovery applications, normally greater than 30,000 tons per day. The high unit volume of helium can substantially improve overall project economics.

In the prior art, natural gas-hydrocarbon streams have been subjected to helium extraction and purification. For instance, in U.S. Pat. No. 3,355,902, a helium containing stream, that predominantly contains nitrogen and hydrocarbons and a minute quantity of carbon dioxide, is cooled and introduced into the fractionation column to separate the vapor from the liquid phases. The gaseous column overhead, that contains negligible amounts of carbon dioxide, is then passed into a phase separator to produce a gaseous stream enriched in helium and a liquid stream. The gaseous stream is further phase separated and the liquid is further fractionated to produce a crude helium stream and a liquid stream.

In U.S. Pat. No. 5,329,775, a cryogenic helium production system is disclosed for separating helium from a stream that contains helium, hydrocarbon and carbon dioxide. Again the helium and carbon dioxide is present within the feed in very low concentrations. The feed is rectified within a liquid vapor contact column to produce a tower overhead which is further cooled and phase separated to produce the helium containing stream.

Both of the patents, mentioned above, are not applicable to the recovery of helium from carbon dioxide containing streams obtained from known underground reservoirs in which carbon dioxide is present at concentration levels greater than 30 mole percent. The low temperature processes illustrated in these patents would be ineffective for high levels of carbon dioxide in the feed due to the fact that the carbon dioxide would solidify.

As will be discussed, the present invention provides a method for separating helium from a gaseous carbon dioxide containing feed that contains at least about 30 mole percent or higher. Such method allows the carbon dioxide containing fraction to be repressurized and returned for use or storage at high pressure. In case of feed streams having a high content of light components, such as nitrogen, the recompression can be carried out in an energy efficient manner given that the volume to be repressurized is lower than that of the feed. As to the separated light components, the present invention is intended to be used with further known purification techniques to produce a crude helium stream that can be stored or further processed (e.g. liquefied). As will be discussed, such method is also applicable to separating other light components such as hydrogen and neon from feed streams having similarly high carbon dioxide contents.

SUMMARY OF THE INVENTION

The present invention provides a method of separating at least one light component from a carbon dioxide containing gaseous mixture containing at least about 30 mole percent carbon dioxide. In accordance with the invention, a first two-phase stream is obtained by at least cooling a pressurized feed stream that is composed of the gaseous carbon dioxide containing mixture such that the pressurized feed stream is partially condensed to form a first two-phase stream. The first two-phase stream is degassified to produce a first vapor stream enriched in the at least one light component and a first liquid stream containing an entrained fraction of the at least one light component. A second two-phase stream is created by at least expanding the first liquid stream to create a second two-phase stream. The second two-phase stream is then degassified to produce a second vapor stream enriched in the at least one light component and a second liquid stream having a rich carbon dioxide content.

In this regard, the term "degasify" as used herein and in the claims means disengagement of a vapor phase from a liquid phase. Such disengagement can take place within a phase separator, a distillation column, a combination of a phase separator and a distillation column or within several such stages of phase separation and/or distillation. As such, the first two-phase stream is obtained by at least cooling the pressurized feed stream and the second two-phase stream is obtained by at least expanding the first liquid stream because several stages of cooling and/or disengagement in any combination are possible to obtain such streams.

In such manner, vapor streams are obtained that are enriched in light component concentration while carbon dioxide containing liquid is also degassed to contribute to light recovery. As will be discussed, the second liquid stream can be repressurized and vaporized and the first and second vapor stream can be combined and further processed to isolate the liquid component(s). Such liquid after repressurization and vaporization can be returned to an enhanced oil recovery process, a pipeline or to high pressure storage. Further processing of the vaporized liquid, in a proper case, can be used to obtain merchant carbon dioxide. The vapor enriched in the light component can also be further processed to isolate the light component, for instance, helium.

It is to be noted that the present invention does not depend on the use of distillation columns and can be conducted in phase separators which are simply chambers to allow disengagement of the vapor and liquid phases. As such, the first two-phase stream and the second two-phase stream can be degassified in first and second phase separators, respectively. In order to further process the light containing vapor, the second vapor stream can be compressed and combined with the first vapor stream to obtain a combined vapor stream.

The repressurization and vaporization of the second liquid stream can comprise dividing the second liquid stream into at least first and second subsidiary liquid streams and vaporizing the first and second subsidiary liquid streams to produce first and second vaporized liquid streams, respectively. The first of the subsidiary liquid streams can be pumped and the second of the vaporized liquid streams can be compressed. The resultant first and second vaporized liquid stream thus pressurized by pumping and compression can thereafter be combined. It is to be noted that more than two pressures of vaporization may be employed and as such, the second liquid stream can be divided into any number of subsidiary liquid streams. In any event, by pumping part of the second liquid stream prior to compression, less power is expended than if all of the liquid after vaporization were compressed. In this regard, the pressurized feed stream can be cooled, at least in part, through indirect heat exchange with the subsidiary liquid streams to cause the vaporization thereof. The at least one light component can be helium, hydrogen or neon and mixtures thereof.

A third two-phase stream containing residual liquid carbon dioxide may be obtained by at least cooling the combined vapor stream. The third two-phase stream can be degassed to produce a third vapor stream having a higher concentration of the at least one light component than the first vapor stream and a third liquid stream can be produced that is enriched in the residual liquid carbon dioxide. Here again, there may be intermediate stages of cooling and/or degassing and hence, the third two-phase stream is obtained at least by cooling. In order to increase recoveries of the light component, the combined vapor stream can be compressed prior to the cooling thereof. Again the degassing of the third two-phase stream can be conducted within a third phase separator. The combined vapor stream can be cooled, at least in part, through indirect heat exchange with a third liquid stream to vaporize a third liquid stream and thereby to form a second vaporized liquid stream. The first and second vaporized liquid streams can be combined and further compressed.

In accordance with another aspect of the present invention, at least one light component can be separated from a supercritical pressure carbon dioxide containing gaseous mixture containing at least about 30 mole percent carbon dioxide. In accordance with this aspect of the present invention, a pressurized feed stream composed of the gaseous carbon dioxide containing mixture can be cooled and expanded so at least a portion of the carbon dioxide liquefies. The pressurized feed stream can be degassed to produce a vapor stream enriched in the at least one light component and a liquid stream enriched in carbon dioxide. The liquid stream can be vaporized to obtain a vaporized liquid stream. Either the vaporized liquid stream can be compressed or the liquid stream can be pumped so that the vaporized liquid stream is obtained at an elevated pressure. This repressurization can be above the critical pressure of the liquid. In such manner, the light components can be removed from the incoming stream and the carbon dioxide can be returned to a source, for instance, a pipeline at pressure in an energy efficient manner.

The degassification of the pressurized feed stream can be effected in a liquid vapor contact column and boil up can be produced within the liquid vapor contact column by heating a liquid column bottoms formed therewithin. The pressurized feed stream can be cooled, at least in part, through indirect heat exchange with a liquid stream after having been pumped. If needed, the pressurized feed stream can be cooled at least in part with a refrigerant flowing within a refrigeration circuit. The expansion can be accompanied by the performance of work and/or through a joule-thomson valve. The performance of work and any expansion can, if necessary, be applied to the pumping of the liquid stream.

In any of the aforesaid embodiments the vapor streams are preferably combined and can be further purified by such known techniques such as adsorption systems, pressure swing adsorption and etc.

BRIEF DESCRIPTION OF THE DRAWINGS

While the specification concludes with claims distinctly pointing out that Applicants regard as to their invention, it is believed that the invention will be better understood when taken in connection with the accompanying drawings in which:

In order to avoid needless repetition, the same reference numbers have been used in the various Figures to illustrate components having the same function and hence, the same description.

DETAILED DESCRIPTION

Figure 1:
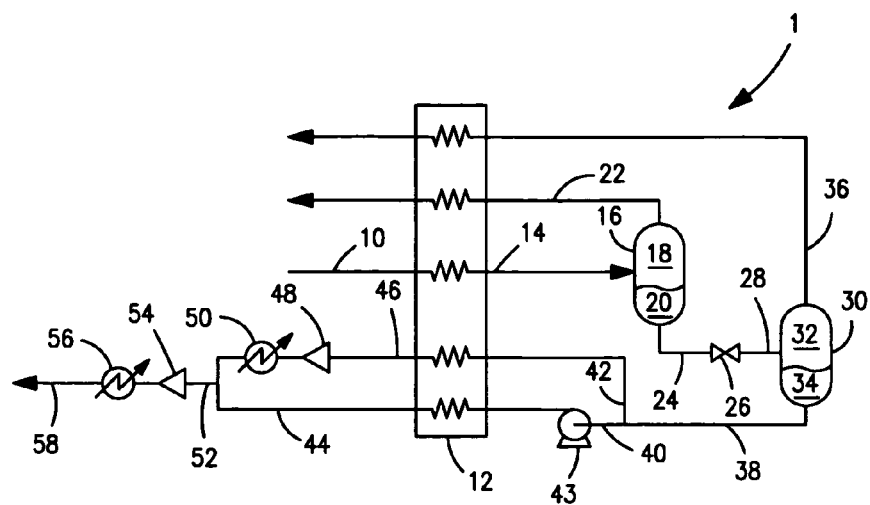
FIG. 1 is a schematic of an apparatus for carrying out a method in accordance with the present invention wherein the feed is obtained at a pressure below the critical pressure.

With reference to FIG. 1 a process flow diagram of an apparatus 1 for carrying out a method in accordance with the present invention is illustrated that is designed to treat subcritical feed streams.

A pressurized feed stream 10 that is composed of a carbon dioxide containing gaseous mixture is obtained at a pressure in a range from between about 200 psia to about 850 psia. More preferably, the pressure of pressurized feed stream 10 is in a pressure range of between about 350 psia and about 750 psia. The pressurized feed stream 10 contains less than 10 mole percent helium and at least 50 mole percent carbon dioxide. Streams containing about 0.1 to 3.0 mole percent helium or greater may be treated. The source of pressurized feed stream 10 may be a natural well or a well head gas obtained at an oil well in which carbon dioxide has been used to enhance recovery. Alternatively, the source gas may be such well gas which has been previously compressed and/or purified and dried to some extent and transported via a pipeline. This having been said, the present invention is equally applicable to the recovery of feeds that contain helium, hydrogen or neon or mixtures thereof. Further, the pressurized feed stream 10 may be obtained from another industrial process so that it is essentially a mixture of carbon dioxide and a light component such as one of the aforesaid gases.

Pressurized feed stream 10 is cooled within a heat exchanger 12 to a temperature that is preferably within a range of between about 30° F. and about −50° F. so that feed stream 10 is partially condensed to form a first two-phase stream 14. It is to be noted that under potential operating conditions feed stream 10 could be fully condensed by cooling. For instance, if feed stream 10 contained about 90 mole percent carbon dioxide, about 2 mole percent helium and about 8 mole percent nitrogen, such stream could be completely condensed at a pressure of about 1000 psia. Thereafter, expansion would be necessary for a two-phase stream. First two-phase stream 14 is then degassed by being introduced into a first phase separator 16 to produce a gaseous phase 18 and a liquid phase 20. The degasification produces a vapor stream 22 that is enriched in the light component or components to be separated. A first liquid stream 24 is also produced that contains an entrained fraction of the light component or components. In order to degass such a mixture, first liquid stream 24 is introduced into joule-thomson valve 26 to produce a second two-phase mixture 28. Second two-phase mixture stream 28 is degassed within a second phase separator 30 to produce a gaseous phase 32 and a liquid phase 34. A second vapor stream 36 is obtained from second phase separator 30 as well as a second liquid stream 38. Second liquid stream 38 has an enriched carbon dioxide content and second vapor stream 36 is also enriched in the light component or components.

First and second vapor streams 22 and 36 are optionally warmed within heat exchanger 12. Second liquid stream 38 may be divided into a first subsidiary liquid stream 40 and a second subsidiary liquid stream 42. First subsidiary liquid stream 40 is pressurized by a pump 43 and vaporized within heat exchanger 12. Second subsidiary liquid stream 42 is also vaporized within heat exchanger 12 for subsequent combination with first subsidiary liquid stream 40. It is to be noted that second vapor stream 36 can be compressed and then combined with first vapor stream 22. Alternatively, in order to effect such combination, first vapor stream 22 could be expanded to a lower pressure and then combined with second vapor stream 36. Additionally, it is to be further noted that second vapor stream 36 can be compressed and recycled back to pressurized feed stream 10 for further processing. In any case, first and second vapor streams 22 and 36 will typically exhibit a relatively low flow relative to feed stream 10 as a consequence they need not be passed through heat exchanger 12.

The vaporization of first subsidiary liquid stream 40 and second subsidiary liquid stream 42 produce first and second vaporized liquid streams 44 and 46, respectively. The second vaporized liquid stream 46 may be compressed by a compressor 48 and optionally, after the heat of compression has removed within an aftercooler 50, may be combined with first vaporized liquid stream 44. Aftercooler 50 may utilize any number of coolants, including refrigerants, air chilled water, brines, and the like. The resultant combined vaporized liquid stream 52 may be further compressed via compressor 54, and then, optionally, after the heat of compression is removed within an aftercooler 56, may be returned as a pressurized stream 58 back to the carbon dioxide source, for instance a pipeline.

It is to be noted that in cases in which pressurized feed stream 10 contains substantial amounts of nitrogen, the removal of nitrogen from the pressurized feed stream 10 and the obtaining of a pressurized carbon dioxide stream allows less compressive energy to be expended upon the return of such stream being that a substantial fraction of the stream has been removed. Further, in the illustrated embodiment, the use of pumping the liquid and then compressing another part of the liquid also adds to the efficiency of the process in that considerably more energy would be expended in compressing second liquid stream 38 had it been vaporized within heat exchanger 12 and then compressed without being partially pumped.

As may be appreciated, the degree of processing and therefore the expense involved in producing purified helium streams decreases with the amount of carbon dioxide present within the feed as contrasted with light components of more comparable boiling point to helium. As such, the process described above, or for that matter any process in accordance with the present invention becomes increasingly more attractive as the carbon dioxide content increases, for instance, above 50 mol percent and more preferably above 90 mole percent.

Figure 2:
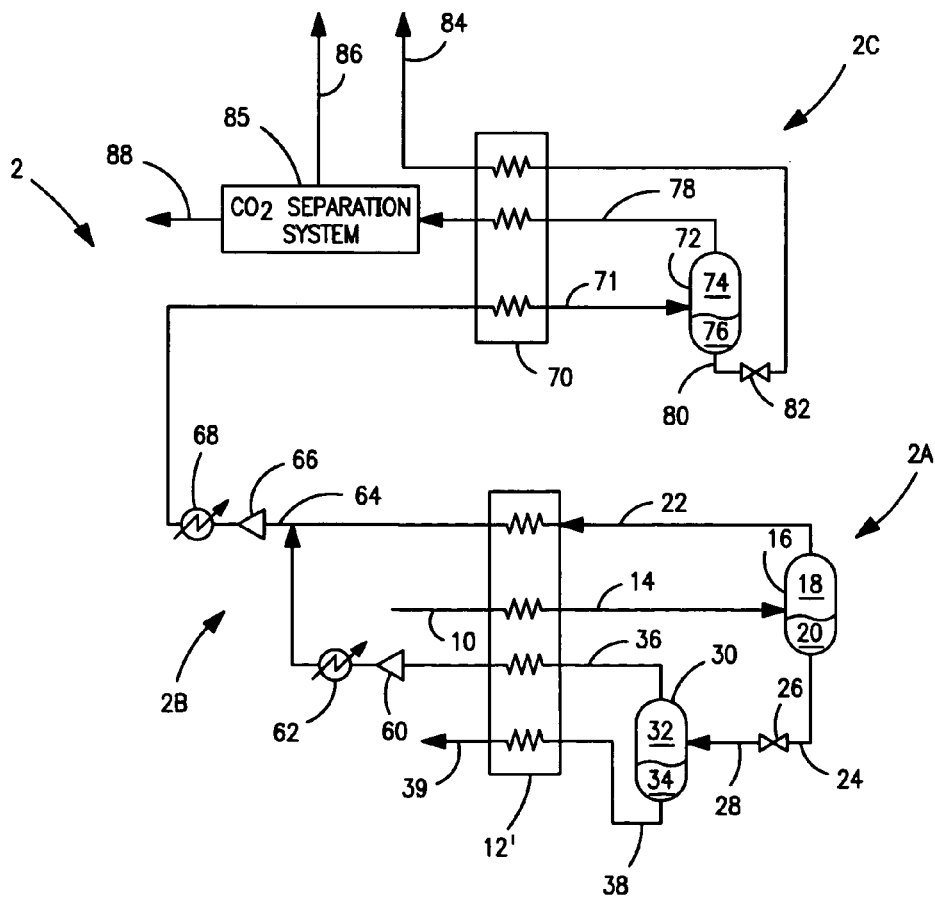
FIG. 2 is a schematic of an apparatus for carrying out a method in accordance with the present invention wherein the light gas is concentrated in multiple steps.

With reference to FIG. 2, an alternative apparatus 2 for practicing a method in accordance with the present invention is illustrated that builds upon apparatus 1. In this embodiment, however, a heat exchanger 12' is utilized to vaporize second liquid stream 38 and thereby to produce a second vaporized liquid stream 39 for further recompression. Additionally, first and second vapor streams 22 and 36 are combined. In this regard, second vapor stream 36 is compressed within a compressor 60 and after cooling within an optional aftercooler 62 is combined with first vapor stream 22. Optionally, the resultant combined stream 64 is compressed within a compressor 66 and after optional cooling within an aftercooler 68 is further cooled within a heat exchanger 70 to a temperature within a range of between about –40 and about –65° F. The resultant two-phase stream 71 is then introduced into third phase separator 72 and degassed. Vapor phase 74 is formed within third phase separator 72 and a third liquid phase 76 is also so formed to produce a third vapor stream 78 and a third liquid stream 80. Third vapor stream 78 has a higher concentration of the one or more light components to be separated than first vapor stream 22.

Liquid stream 80 is passed through a joule-thomson valve 82 and depressurized to yield a temperature in the range of between about –60 and about –70° F. The resulting liquid stream 80 after depressurization is passed through heat exchanger 70 and vaporized to produce a third vaporized liquid stream 84. The vaporization of liquid stream 80 effects the cooling of combined vapor stream 64. Third vaporized liquid stream 84 may be recompressed and combined with second vaporized liquid stream 39.

Third vapor stream 78 after having been warmed will contain between about 15 and about 30 mole percent carbon dioxide. Such a stream may be directed to an ambient temperature carbon dioxide separation system 85 which can be an amine absorption system or a pressure swing adsorption system. Essentially all of the carbon dioxide contained within third vapor stream 78 is removed and may exit the process as a vent stream 86, it being at too low a pressure and flow rate to be profitably recovered (in general). The amine adsorber overhead, not shown, contains a trace amount of carbon dioxide and will be saturated by water. These contaminants can be effectively removed by the use of thermal swing adsorption which can in a known manner form part of carbon dioxide separation system 85. This produces a purified helium containing stream 88 which may be further purified.

Figure 3:
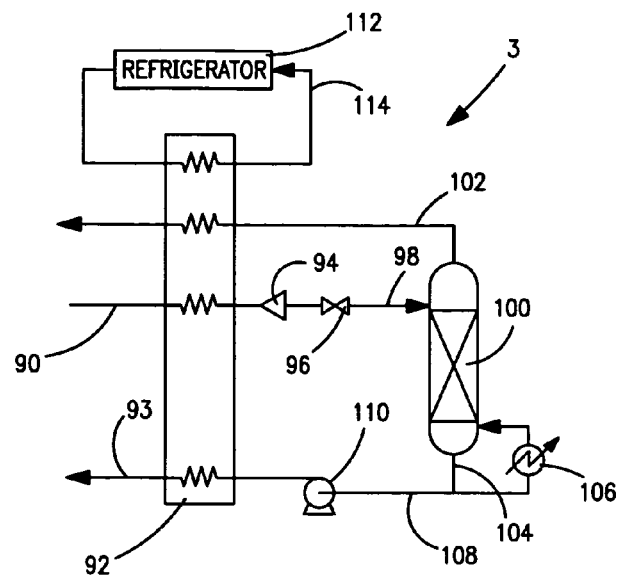
FIG. 3 is a schematic of an apparatus for carrying out a method in accordance with the present invention wherein the feed is obtained at supercritical pressure, for instance from a pipeline.

With reference to FIG. 3, a process flow of an apparatus 3 is illustrated and is specifically designed to handle a pressurized feed stream 90 that is at a supercritical pressure. Such streams are typically available from a pipeline source and have a pressure that range from between about 1500 psia and about 3000 psia. Pressurized feed stream 90 is cooled within a heat exchanger 92 to a temperature in the range of between about 40 and about –40° F. Pressurized feed stream 90 is then directed to a dense phase liquid expander 94 in which the pressurized feed stream is depressurized with the simultaneous production of shaft work. Typically, the pressure of pressurized feed stream 90 after having been depressurized within dense phase expander 94 will be in a pressure range of between about 800 psia and about 1200 psia. After depressurization, the liquid stream may be further depressurized by expansion within a joule-thomson valve 96 and exits as a substantially liquid stream 98. As may be appreciated, in a possible embodiment, either dense phase expander or joule-thomson valve 96 may be used alone.

Liquid stream 98 is introduced into a distillation column 100 having structured packing or trays to effect countercurrent vapor-liquid mass transfer. Preferably between about 15 and about 30 theoretical stages of separation are provided. Distillation column 100 is reboiled by adding heat to the column bottoms formed therewithin to produce a vapor stream 102 that is enriched in helium or other light components to be separated. Vapor stream 102 will typically contain between about 1 and about 10 mole percent helium and between about 40 and about −70 mole percent carbon dioxide the balance being entrained light gases such as nitrogen and methane. A portion of the liquid column bottom stream 104 may be heated within a heater 106 and returned to the bottom of distillation column 100 to produce boil up. The remaining fraction of column bottoms stream 108 may be pumped by a pump 110 and then vaporized within heat exchanger 92 to produce a vaporized liquid stream 93 which can be further compressed back to the supercritical pressure of pressurized feed stream 90. After such recompression, vaporized liquid stream can be returned to a high pressure source such as the pipeline originating source.

Depending upon the purity of the liquid column bottoms as well as the pressures existing in pressurized feed stream 90 and vaporized liquid stream 93, it may be necessary to balance the refrigeration demands of the process. This can be provided by a refrigeration system 112 having a refrigeration circuit 114 to pass a refrigerant into heat exchanger 92. The refrigerant passing within refrigerant circuit 114 is obtained at a temperature below that of pressurized feed stream 90. Typical refrigeration systems applicable to refrigeration system 112 include mixed gas refrigeration, pure component vapor compression refrigeration as well as gas expansion refrigeration (reverse-Brayton). It is to be noted that external refrigeration is equally applicable to the other embodiments of the present invention described with reference to FIGS. 1 and 2. Such refrigerators could be used to cool the incoming pressurized feed streams.

Figure 4:
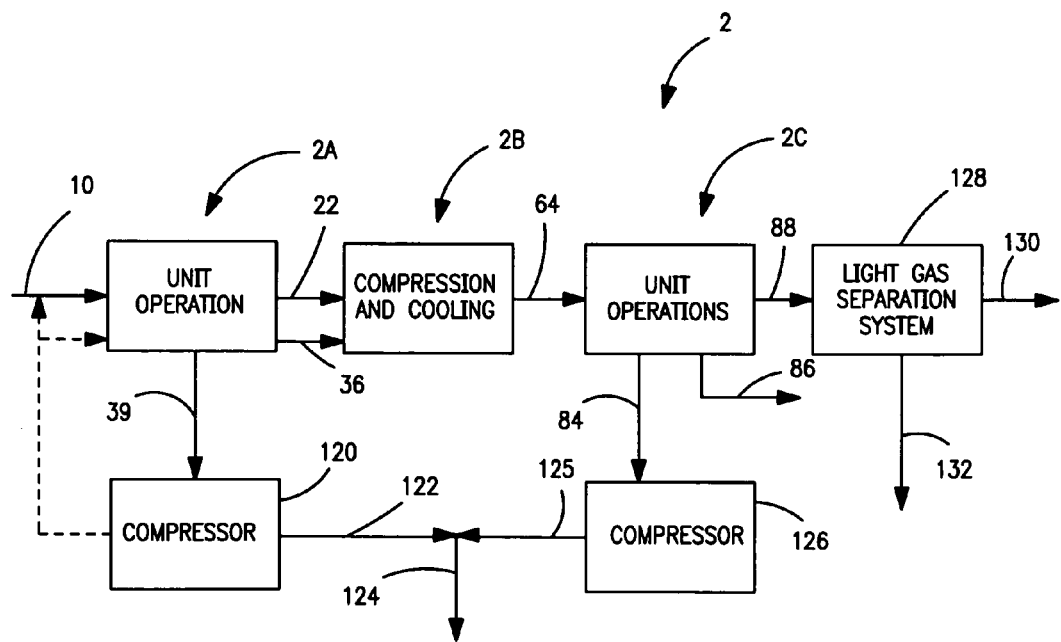
FIG. 4 is a schematic diagram of an apparatus for carrying out a method in accordance with the present invention that can utilize any of the apparatus and methods shown in the previous Figures, but is illustrated in connection with the embodiment shown in FIG. 2.

With reference to FIG. 4, the integration of the embodiment illustrated in FIG. 2 is illustrated. Similar integrations would apply to the embodiment shown in FIGS. 1 and 3. In this particular illustrated integration, the vaporized liquid stream 39 is compressed by a compressor 120 which may comprise direct gas compression and cooling. It is to be noted that pumping and vaporization might also have been used as shown in FIG. 1. The compression produces a pressurized stream 122 which can be directed to a send out pipeline 124. As can be appreciated, pressurized stream 122 can be utilized directly on site for applications such as enhanced oil recovery, merchant liquid carbon dioxide generation, waste water treatment, semiconductor applications and the like. Although not illustrated, all or part of pressurized feed stream 122 can be recycled back to apparatus 2. As has been indicated above, third vaporized liquid stream 84 may be compressed within a compressor 126 and likewise returned to send out pipeline 124.

In FIG. 4, the unit operations (shown in FIG. 2) involving heat exchanger 12' and first and second phase separators 16 and 30 are grouped together as unit operations 2A. Unit operations 2A produce first and second vapor streams 22 and 36 that are compressed and combined by the operations involving compressor 60 and 66 and after coolers 62 and 68 which are grouped as unit operations 2B. The operations involving heat exchanger 70, third phase separator 72 and carbon dioxide separation system 85 are grouped together as unit operations 2C that produce vaporized liquid stream 84 and purified helium containing stream 88. Purified helium containing stream 88 has a carbon dioxide content of less than 0.1 mole percent and preferably less than 50 parts ppm. Further, purified helium containing stream 88 typically contains between about 5 and 15 mole percent helium and generally will be in a pressure range of between about 250 and about 800 psia. The balance of the stream will be light gases, such as nitrogen and methane. Purified helium containing stream 88, as such, may be directed to a light gas separation system 128 which may be any one of a number of known technologies such as direct phase separation, distillation, membranes and pressure swing adsorption. A crude helium stream 130 is produced that contains about 70 mole percent helium. Crude helium stream 130 may be taken as a product, stored, pressurized for transport or further use (or liquefied). A light gas fraction 132 may be vented or further compressed, separated within light gas separation system 128 for use elsewhere.

While the present invention has been described with reference to a preferred embodiment, as will be understood by those skilled in the art, numerous changes, omissions and additions can be made without departing from the spirit and the scope of the present invention.

I claim:

1. A method of separating at least one light component from a carbon dioxide containing gaseous mixture having at least about 30 mole percent carbon dioxide, said method comprising:
   obtaining a first two-phase stream by at least cooling a pressurized feed stream composed of the gaseous carbon dioxide containing mixture such that said pressurized feed stream is partially condensed;
   degasifying the first two-phase stream to produce a first vapor stream enriched in the at least one light component and a first liquid stream containing an entrained fraction of the at least one light component;
   creating a second two-phase stream by at least expanding said first liquid stream;
   degasifying the second two-phase stream to produce a second vapor stream enriched in the at least one light component and a second liquid stream having an enriched carbon dioxide content;
   compressing said second vapor stream; and
   combining said second vapor stream with said first vapor stream to obtain a combined vapor stream.

2. The method of claim 1, wherein the first two-phase stream and the second two-phase stream are desgasified in first and second phase separators, respectively.

3. A method of separating at least one light component from a carbon dioxide containing gaseous mixture having at least about 30 mole percent carbon dioxide, said method comprising:
   obtaining a first two-phase stream by at least cooling a pressurized feed stream composed of the gaseous carbon dioxide containing mixture such that said pressurized feed stream is partially condensed;
   degasifying the first two-phase stream to produce a first vapor stream enriched in the at least one light component and a first liquid stream containing an entrained fraction of the at least one light component;

creating a second two-phase stream by at least expanding said first liquid stream:

degasifying the second two-phase stream to produce a second vapor stream enriched in the at least one light component and a second liquid stream having an enriched carbon dioxide content;

dividing the second liquid stream into at least first and second subsidiary liquid streams;

vaporizing the first and second subsidiary liquid streams to produce first and second vaporized liquid streams, respectively;

pumping the first of the subsidiary liquid streams and compressing the second of the vaporized liquid streams; and combining the first and second vaporized liquid streams.

4. The method of claim 1, further comprising:

dividing the second liquid stream into subsidiary liquid streams;

vaporizing the subsidiary liquid streams to produce vaporized liquid streams;

pumping at least a first of the subsidiary liquid streams and compressing at least a second of the vaporized liquid streams; and combining the first and second of the vaporized liquid streams.

5. The method of claim 4, wherein the first two-phase stream and the second two-phase stream are degasified in first and second phase separators, respectively.

6. The method of claim 5, wherein the pressurized feed stream is cooled, at least in part, through indirect heat exchange with the subsidiary liquid streams to cause vaporization thereof.

7. The method of claim 1 or claim 6, wherein the at least one light component is helium, hydrogen or neon.

8. The method of claim 1, further comprising:

obtaining a third two-phase stream containing residual liquid carbon dioxide by at least cooling the combined vapor stream; and degassing the third two-phase stream to produce a third vapor stream having a higher concentration of the at least one light component than the first vapor stream and a third liquid stream enriched in said residual liquid carbon dioxide.

9. The method of claim 8, further comprising, further compressing said combined vapor stream prior to the cooling thereof.

10. The method of claim 8, wherein the degassing of the first two-phase stream, the second two-phase stream and the third two-phase stream are conducted within first, second and third separators, respectively.

11. The method of claim 8, wherein:

the pressurized feed stream is cooled at least in part through indirect heat exchange with the second liquid stream to cause vaporization of the second liquid stream and thereby to form a first vaporized liquid stream;

the third liquid stream is expanded;

the combined vapor stream is cooled, at least in part, through indirect heat exchange with the third liquid steam to vaporize the third liquid stream and form a second vaporized liquid stream; and the first and second vaporized liquid streams are combined and further compressed.

12. The method of claim 8 or claim 11 wherein the at least one light component is helium, nitrogen or neon.

13. A method of separating at least one light component from a supercritical pressure carbon dioxide containing gaseous mixture containing at least about 30 mole percent carbon dioxide, said method comprising:

cooling a pressurized feed stream composed of the supercritical pressure carbon dioxide containing gaseous mixture;

expanding said pressurized feed stream so that at least a portion of the carbon dioxide liquefies;

degasifying said pressurized feed stream to produce a vapor stream enriched in the at least one light component and a liquid stream enriched in the carbon dioxide;

vaporizing the liquid stream to obtain a vaporized liquid stream; and compressing the vaporized liquid stream or pumping the liquid stream so that the vaporized liquid stream is obtained at an elevated pressure.

14. The method of claim 13 where the elevated pressure of the vaporized liquid stream is above its critical pressure.

15. The method of claim 13, wherein the degasification of the pressurized feed stream is effectuated in a liquid-vapor contact column and boil up is produced within said liquid-vapor contact column by heating a liquid column bottoms formed therewithin.

16. The method of claim 13 wherein the pressurized feed stream is cooled at least in part with a refrigerant flowing within a refrigeration circuit.

17. The method of claim 13, wherein the expansion is accompanied by the performance of work followed by a joule-thomson expansion.

18. The method of claim 12, wherein the pressurized feed stream is cooled, at least in part, through indirect heat exchange with the liquid stream after having been pumped.

19. The method of claim 12, wherein the at least one light component is helium, hydrogen or neon.

* * * * *